(No Model.) 3 Sheets—Sheet 1.
C. A. FAURE.
STEERING MECHANISM FOR MOTOR VEHICLES.
No. 591,595. Patented Oct. 12, 1897.
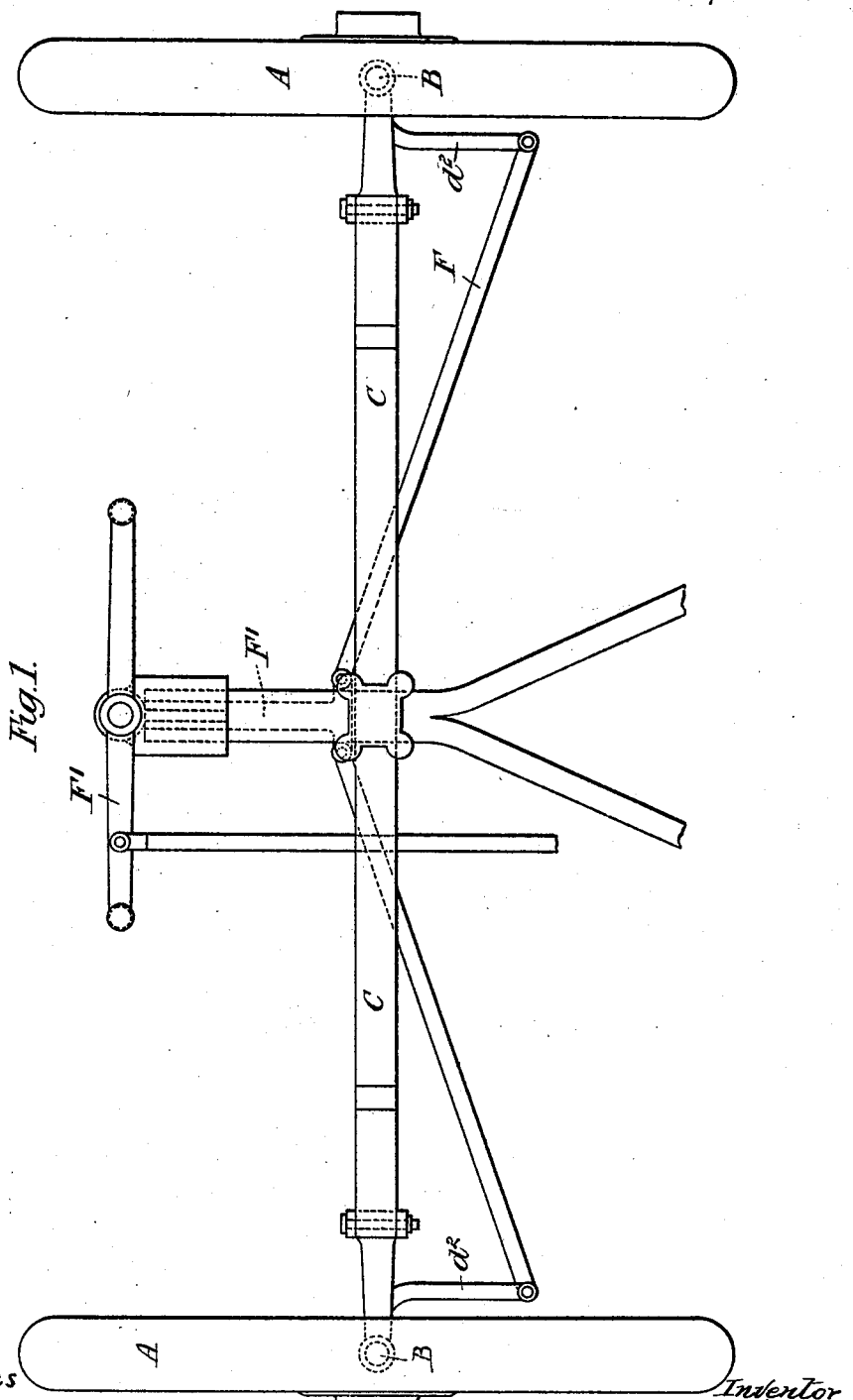

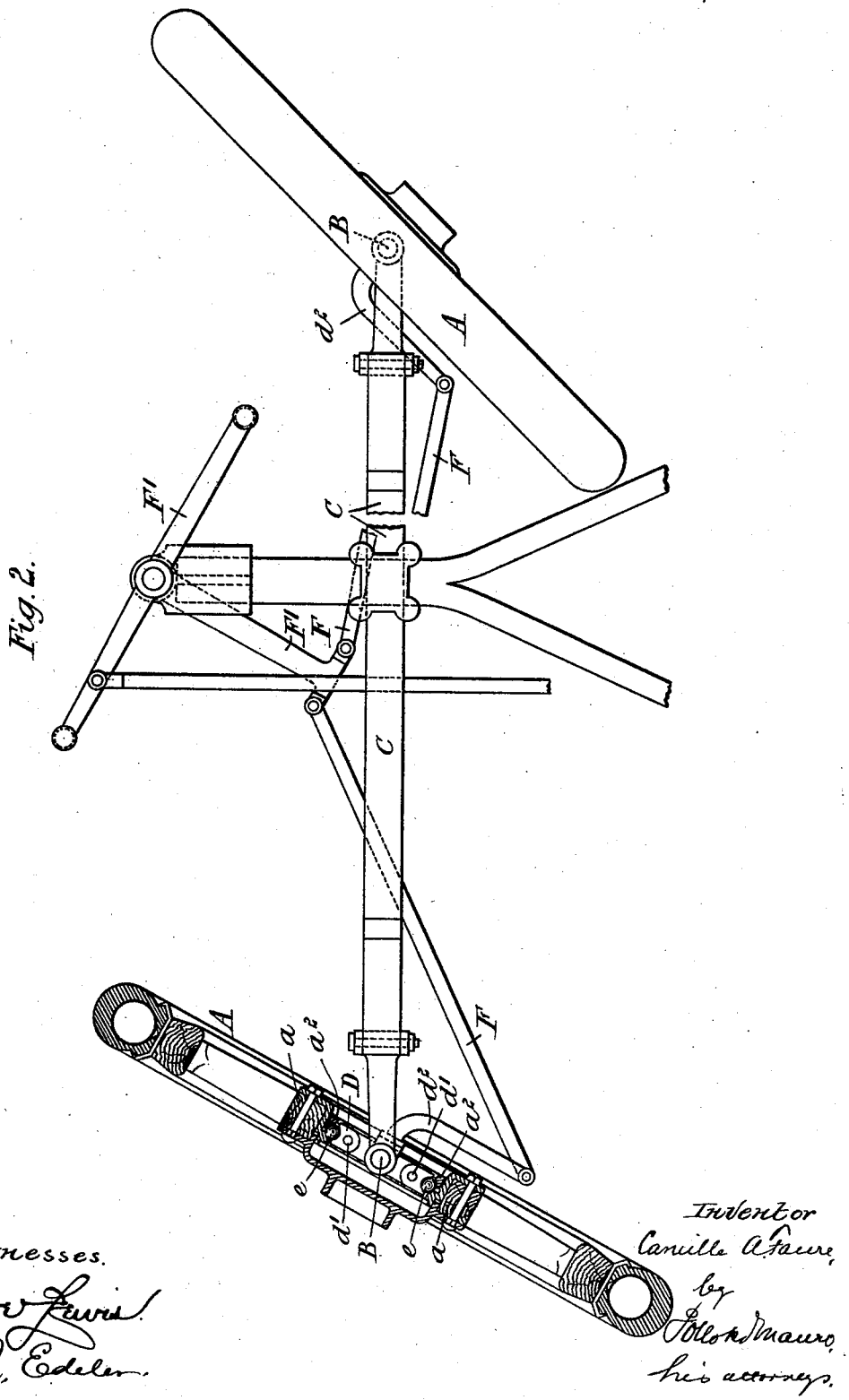

(No Model.) 3 Sheets—Sheet 3.
C. A. FAURE.
STEERING MECHANISM FOR MOTOR VEHICLES.
No. 591,595. Patented Oct. 12, 1897.
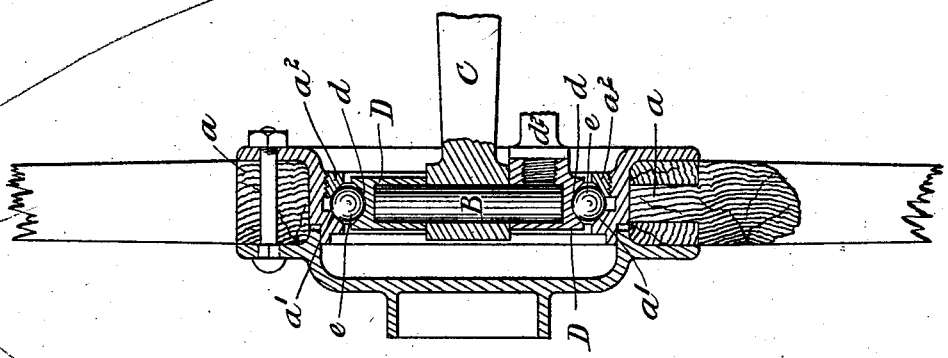
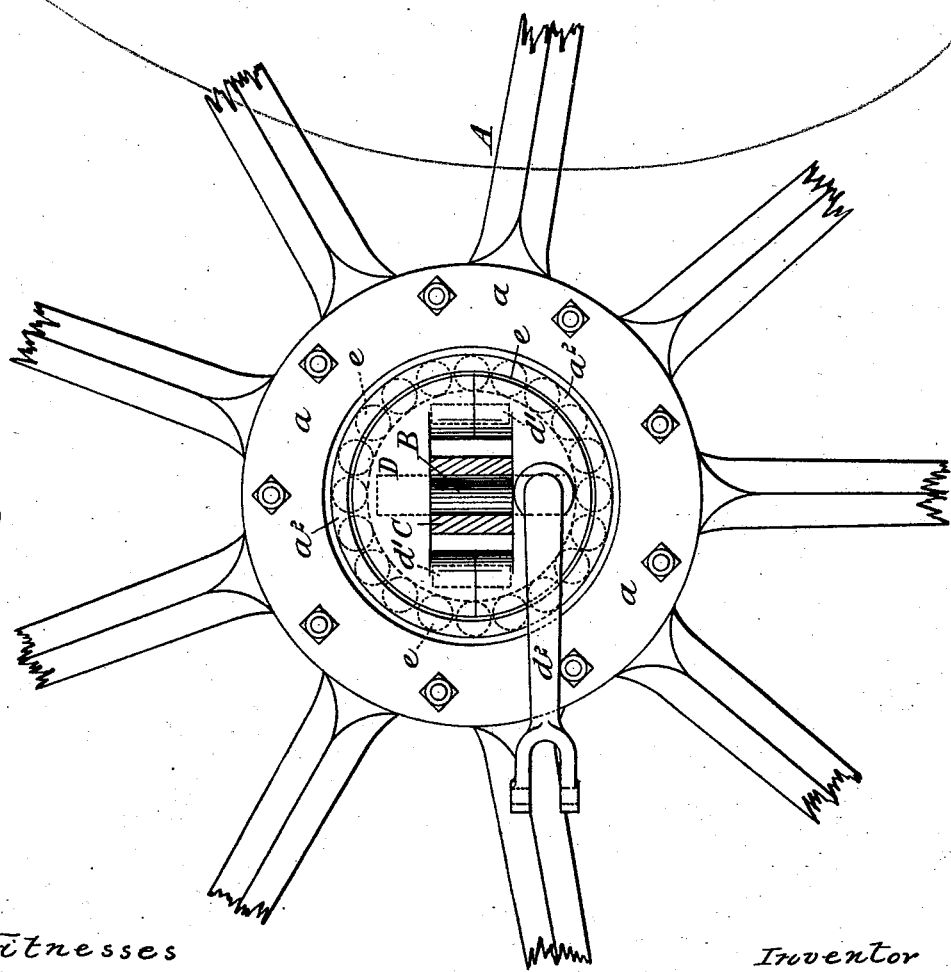
Witnesses
Reeve Lewis
W. R. Edelen.
Inventor
Camille A. Faure,
by Pollok & Mauro
his attorneys
THE NORRIS PETERS CO., PHOTO-LITHO., WASHINGTON, D. C.

UNITED STATES PATENT OFFICE.

CAMILLE ALPHONSE FAURE, OF PARIS, FRANCE.

STEERING MECHANISM FOR MOTOR-VEHICLES.

SPECIFICATION forming part of Letters Patent No. 591,595, dated October 12, 1897.

Application filed January 18, 1897. Serial No. 619,661. (No model.) Patented in Belgium May 4, 1895, No. 115,425, and in France November 4, 1895, No. 251,431.

*To all whom it may concern:*

Be it known that I, CAMILLE ALPHONSE FAURE, engineer, a citizen of the French Republic, residing at 37 Avenue de la Republique, Paris, in the Republic of France, have invented certain Improvements in or Connected with the Steering Mechanism of Motor Road-Vehicles, (for which I have obtained patents in Belgium, No. 115,425, dated May 4, 1895, and in France, No. 251,431, dated November 4, 1895,) of which the following is a specification.

This invention relates to road-vehicles driven by motors contained within or carried by the vehicle; and the object of the invention is to so arrange the steering-wheels and their connections that steering is effected with great facility and with a minimum of power and with less injury to the wheels than hitherto. The steering-wheels are pivoted and constructed or arranged in such a way as to reduce to a minimum the force necessary to turn them on the road, they being mounted and operated so that they are turned on the road on the central bearing-point of their periphery. They are each pivoted on a pin fixed to the end of the axle, a disk being mounted on the said pin, this disk being received in the hub of the wheel. The periphery of the disk and the interior of the hub have corresponding grooves, and antifriction-balls are mounted in the said grooves, so as to constitute ball-bearings between the disk and hub. The steering motion is conveyed to the said wheels by means of angled arms secured to the disks and connected by rods and levers to a pedal or other operating device, as hereinafter fully described.

I will describe my invention by reference to the accompanying drawings, in which—

Figure 1 is a plan showing a pair of wheels mounted according to the said invention, the wheels in this view being represented in the position which they occupy when the vehicle to which they are attached is moving in a straight course. Fig. 2 is a view, partly in plan and partly in horizontal section, showing the arrangement represented in Fig. 1, the wheels being shown in the position which they occupy when the vehicle is being turned. Figs. 3 and 4 are respectively an elevation and a vertical section of a portion of one of the wheels. Figs. 1 and 2 are drawn to a scale smaller than that to which Figs. 3 and 4 are drawn.

Like letters of reference indicate like parts in the several figures.

A are the steering-wheels, in the hub of each of which is contained a disk D, mounted and capable of turning on a pin B, fixed to the end of the axle C. The periphery of each of the disks D and the interior of each of the hubs $a$ are formed with corresponding grooves $d$ $a'$, respectively, and antifriction-balls $e$ are mounted in the said grooves, as shown most clearly in Figs. 3 and 4. The hub $a$ is preferably provided with an adjustable ring $a^2$, which is screwed into the said hub, and by it the ball-bearings can be tightened or loosened. By removing the said ring $a^2$ from the hub $a$ the balls can be removed or placed in position. If desired, the ring $a^2$ may be dispensed with and the balls be placed in the grooves $d$ $a'$ through an opening formed in the hub $a$, the said opening being normally closed by a plug. Each of the disks D is formed in two parts for convenience of placing it upon the pivot-pin B, these two parts being fitted together in correct position by means of dowel-pins $d'$.

The steering motion is conveyed to the wheels A by means of arms $d^2$, which are angled, as shown, secured to the disks D and connected by rods F and a lever F' to a pedal or hand-lever or other operating device.

It will be seen by reference to Figs. 1 and 2 that when the steering mechanism is operated the disks D, upon which the wheels A freely rotate, are correspondingly deflected by turning on the pins B, so as to cause the peripheries of the said wheels to turn on a point on the road as a pivot and assume the positions necessary for traveling in the desired direction.

The provision of the angled lever-arms $d^2$ gives the requisite leverage to enable the wheels to be deflected with ease by the exertion of a minimum of force by the operator, while the provision of the antifriction-balls between the disk and the hub of the wheel enables the wheel to rotate freely, which it could not do in the absence of such balls.

Having now particularly described and ascertained the nature of my said invention and in what manner the same is to be performed, I declare that what I claim is—

1. The combination with a wheel and an axle therefor, of a disk pivoted to the axle in the plane of the wheel and located within the hub of the latter, ball-bearings located in corresponding grooves in the periphery of the disk and the interior of the hub, an adjustable ring which forms in part one of said grooves, and means for turning the disk on its pivot, substantially as described.

2. The combination with a wheel and an axle therefor, of a disk upon which the wheel rotates, said disk being formed in two parts with a slot at their meeting edges into which the axle projects, and a pin passing from one part of the disk to the other through the axle, whereby the disk is pivoted to the axle, substantially as described.

In testimony whereof I have signed my name to this specification in the presence of two subscribing witnesses.

CAMILLE ALPHONSE FAURE.

Witnesses:
EDWARD P. MACLEAN,
DAVID T. S. FULLER.